United States Patent Office 3,660,417
Patented May 2, 1972

---

3,660,417
CERTAIN 2-IMINO-5-NITROTHIAZOLINES
Peter John Islip, Hampton, England, assignor to Parke-Davis & Company, Detroit, Mich.
No Drawing. Filed Nov. 9, 1970, Ser. No. 88,169
Claims priority, application Great Britain, Mar. 11, 1970, 11,783/70
Int. Cl. C07d *91/26*
U.S. Cl. 260—306.7     6 Claims

ABSTRACT OF THE DISCLOSURE

New thiazoline compounds having the formula

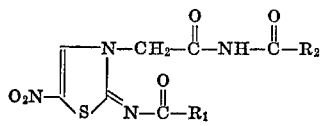

where $R_1$ is lower alkyl, lower alkoxy, cyclopropyl, phenyl, or 2-thienyl, and $R_2$ is lower alkyl or cyclopropyl; and their production by reacting a thiazole with a 2-haloacetamide in the presence of a base or by reacting a 5-nitro-4-thiazoline-3-acetamide with a reactive carboxylic acid derivative in the presence of an acid catalyst. The compounds of the invention are useful as schistosomacides and trichomonacides.

SUMMARY AND DETAILED DESCRIPTION

The present invention relates to new heterocyclic compounds that are useful as chemotherapeutic agents and to methods for their production. More particularly, the invention relates to new thiazoline compounds having the formula

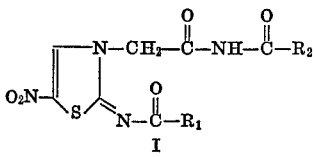

where $R_1$ is lower alkyl, lower alkoxy, cyclopropyl, phenyl, or 2-thienyl, and $R_2$ is lower alkyl or cyclopropyl. The lower alkyl and lower alkoxy groups that may appear in the foregoing formula are those having not more than 4 carbon atoms.

In accordance with the invention, compounds having the foregoing formula are produced by reacting a thiazole compound having the formula

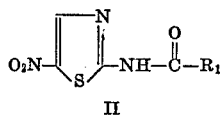

with a 2-haloacetamide compound having the formula

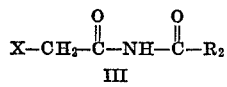

in the presence of a base; where $R_1$ and $R_2$ have the aforementioned significance, and X is chlorine, bromine, or iodine, and preferably, bromine. Bases that may be employed in this reaction include alkali metal hydrides, alkali metal amides, and alkali metal alkoxides. The preferred base is an alkali metal hydride, particularly sodium hydride. The reaction is best carried out in an unreactive solvent medium. With the preferred alkali metal hydride base, any of a number of anhydrous, non-hydroxylic solvents may be used, including ethers, such as diethyl ether, dioxane, and tetrahydrofuran; aromatic hydrocarbons, such as benzene and toluene; tertiary amides, such as N,N-dimethylformamide and N-methyl-2-pyrrolidinone; and dimethyl sulfoxides; as well as mixtures of these. A preferred solvent is N,N-dimethylformamide. The temperature and duration of the reaction are not critical and may be varied over a wide range, the temperature from 0 to 100° C. and the duration from about 15 minutes to about 24 hours. In the preferred method for carrying out the reaction, the thiazole compound of Formula II and the base are first mixed together in the chosen solvent, the 2-haloacetamide compound of Formula III is added, and the resulting reaction mixture is stirred for a period of from about 30 minutes to 4 hours at a temperature in the range of 15 to 60° C. Equimolar quantities of reactants and base are normally employed, although a slight excess of any one is not harmful. To insure completeness of reaction, it may be desirable to use a slight excess of both the 2-haloacetamide compound and the base.

The 2-haloacetamide compounds used as starting materials in the foregoing process can in general be prepared by reacting a 2-haloacetyl chloride having the formula

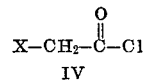

IV with an amide having the formula

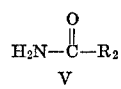

V where each of $R_2$ and X has the same meaning as previously given. The method of preparation of the thiazole starting materials of Formula II is illustrated in detail hereinafter with reference to a specific example.

Also in accordance with the invention, compounds having Formula I above are produced by reacting a 5-nitro-4-thiazoline-3-acetamide compound having the formula

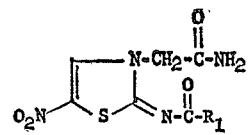

VI with a reactive derivative of an acid having the formula

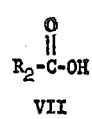

VII in the presence of an acid catalyst; where each of $R_1$ and $R_2$ is a defined earlier. Suitable reactive derivatives of the acid of Formula VII that may be used are the acid anhydride and an acid halide. When the acid anhydride is readily available, it is the preferred reactive derivative. Any of a number of acid catalysts may be used, including the mineral acids, hydrochloric, hydrobromic, nitric, sulfuric, and phosphoric acids, and strongly acidic organic acids, such as benzenesulfonic acid. A preferred acid catalyst is concentrated sulfuric acid. While the reaction can be carried out in an unreactive solvent medium, such as an ether, an aromatic hydrocarbon, a tertiary amide, or dimethyl sulfoxide, it is convenient and preferred to avoid an added solvent by using a substantial excess of the reactive acid derivative. The temperature and duration of the reaction are not critical and may be varied widely depending, somewhat upon the reactive acid derivative. In general, the reaction temperature can be varied between 50 and 175° C. and the duration from 15 minutes to 24 hours. A preferred temperature is one in the range of 100–150° C., and, at such a temperature, the reaction is essentially complete after 0.5–10 hours.

The 5-nitro-4-thiazoline-3-acetamide compounds used as starting materials in the foregoing process are prepared by reacting a thiazole compound having Formula II above with a 2-haloacetamide having the formula

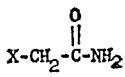

VIII in the presence of a base, such as sodium hydride; where X has the aforementioned significance.

The compounds of the invention are new chemical compounds that are useful as chemotherapeutic agents, especially as antiparasitic agents that are active schistosomacides and trichomonacides. Their activities can be demonstrated and quantitatively measured in standard tests against *Schistosoma mansoni* and *Trichomonas vaginalis*.

In the test used to determine schistosomacidal activity, female Stout mice weighing 13–15 grams each are infected intraperitoneally with 75 *S. mansoni* (Puerto Rican strain) cercariae (from the snail host *Australorbis glabratus*) 6 weeks prior to treatment. The experimental groups usually consist of 5 to 10 mice, while the sham-dosed control groups number 10 to 15 mice per experiment. All of the mice are fed Rockland mouse food from the time of infection to autopsy. The test compounds are administered in the diet or by gavage. Following treatment for a measured period, the animals are killed and autopsied, and the activity of the test compound is evaluated primarily on the basis of the distribution and number of living and dead worms in the liver, portal veins, and mesenteric veins. This activity is then expressed in terms of the percentage of schistosomes found killed after the period of treatment at a given dosage level, which is expressed either as a percentage of the diet or in mg./kg./day when administration is by gavage. The activities of some representative compounds of the present invention, as determined by this test procedure, are shown in the table that follows. The compounds in the table are identified by reference to Formula I.

SCHISTOSOMACIDAL ACTIVITY

| Compound | | Gavage dose, mg./kg./day for 5 days | Percent schistosomes dead |
|---|---|---|---|
| $R_1$ | $R_2$ | | |
| Cyclopropyl | Methyl | 50 | 100 |
| | | 25 | 74 |
| —$C(CH_3)_3$ | do | 25 | 97 |
| | | 12.5 | 79 |
| Phenyl | do | 200 | 100 |
| | | 25 | 90 |
| Do | Ethyl | 200 | 94 |
| —$C(CH_3)_3$ | n-Propyl | 200 | 100 |
| | | 50 | 77 |
| 2-thienyl | Ethyl | 50 | 86 |
| | | 25 | 93 |
| Ethyl | do | 200 | 100 |
| | | 25 | 88 |
| Methyl | Methyl | 50 | 89 |
| Ethoxy | Ethyl | 50 | 99 |
| —$C(CH_3)_3$ | Cyclopropyl | 12.5 | 75 |
| | | 50 | 100 |
| | | 12.5 | 71 |

The test used to determine trichomonacidal activity is an in vitro test against *Trichomonas vaginalis*. In this test, Kupferberg's medium, containing 250 γ/ml. of sodium penicillin G and streptomycin sulfate, is inoculated with a sufficient number of organisms from a 24-hour Kupferberg culture to give 10,000 trichomonads/ml. The resulting mixture (4.5 ml.) is then added to 0.5 ml. of a solution or suspension of a measured quantity of the test compound in aqueous ethanol in screw-capped tubes, and the tubes are incubated at 37.0° C. for 48 hours. Varied concentrations of the test compound are obtained by serial dilution. After incubation, the effect of the test compound is determined by microscopic examination of 0.02 ml. of the test preparation dispersed under a 22 x 22 mm. coverslip.

The number of viable trichomonads per Howard disc field is recorded, with at least 10 fields being counted. The test preparations are also compared with control tubes to which no test compound is added. The test compound is rated as follows, according to the percentage of suppression of the number of viable organisms; cidal—100% static—90 to 99.9%; suppressive—50 to 89.9%; inactive—less than 50%. The trichomonacidal activities of some representative compounds of the present invention, as determined by the foregoing test procedure, are shown in the following table, where the compounds are again identified by reference to Formula I.

TRICHOMONACIDAL ACTIVITY

| Compound | | Rating (concentration, γ/ml.) |
|---|---|---|
| $R_1$ | $R_2$ | |
| Cyclopropyl | Methyl | Static (25). Suppressive (6.25). |
| —$C(CH_3)_3$ | do | Cidal (25). Suppressive (1.56). |
| Phenyl | Ethyl | Cidal (25). Suppressive (6.25). |
| —$C(CH_3)_3$ | n-Propyl | Cidal (6.25). |
| 2-thienyl | Methyl | Suppressive (25). |
| Ethyl | Ethyl | Cidal (25). Suppressive (6.25). |
| Ethoxy | do | Cidal (25). Suppressive (6.25). |
| —$C(CH_3)_3$ | Cyclopropyl | Cidal (6.25). |

The invention is illustrated by the following examples.

EXAMPLE 1

To a stirred solution of 7.85 g. of N-(5-nitro-2-thiazolyl)cyclopropanecarboxamide in 50 ml. of N,N-dimethylformamide is first added, in portions, 1.40 g. of a 63% sodium hydride in mineral oil dispersion and then 7.4 g. of 2-bromo-diacetamide. The resulting mixture is stirred for one hour at room temperature and diluted with water. The solid 2 - {2 - [(cyclopropylcarbonyl)imino]-5-nitro-4-thiazolin - 3 - yl}-diacetamide that precipitates is isolated, washed with water, and purified by crystallization from 96% ethanol; M.P. 258–260° C. (with decomposition).

Utilizing the foregoing procedure, from 9.1 g. of 2,2-dimethyl-N-(5-nitro-2-thiazolyl)propionamide, 1.46 g. of a 66% sodium hydride in mineral oil dispersion, and 8.0 g. of 2-bromodiacetamide in 60 ml. of N,N-dimethylformamide, there is obtained 2-[5-nitro-2-(pivaloylimino)-4-thiazolin-3-yl]-diacetamide; M.P. 224–226° C. (with decomposition), following crystallization from 96% ethanol.

The 2-bromodiacetamide starting material is obtained as follows. To a solution of 33.7 g. of acetamide in 200 ml. of benzene, heated under reflux, is slowly added 90.4 g. of bromoacetyl chloride, and the resulting mixture is heated under reflux for an additional 6 hours, cooled, and filtered. The filtrate is evaporated under reduced pressure, and the residue obtained is triturated with ether to give a crystalline solid, which is 2-bromodiacetamide; M.P. 111–113° C., following crystallization from 96% ethanol.

The 2,2 - dimethyl-N-(5-nitro-2-thiazolyl)propionamide starting material is prepared by the following procedure. To a chilled, stirred mixture of 29.0 g. of 2-amino-5-nitrothiazole, 16.6 g. of pyridine, and 150 ml. of tetrahydrofuran is added 25.3 g. of pivaloyl chloride. The resulting mixture is heated to 50° C., 100 ml. of acetonitrile is added, and the solution obtained is allowed to cool to room temperature and is then poured into ice water. The solid 2,2 - dimethyl - N-(5-nitro-2-thiazolyl)propionamide that precipitates is isolated, washed with water, and dried; M.P. 136–138° C., following crystallizations from ethanol and benzene.

EXAMPLE 2

A mixture consisting of 5.2 g. of 2-(benzoylimino)-5-nitro-4-thiazoline-3-acetamide, 50 ml. of acetic anhydride, and 4 drops of concentrated sulfuric acid is stirred and heated at 100° C. for 2 hours, at 120° C. for one hour, and is then kept at room temperature for 16 hours. The solid 2 - [2 - (benzoylimino) - 5-nitro-4-thiazolin-3-yl]diacetamide that precipitates is isolated and dried; M.P. 272–

274° C. (with decomposition), following crystallization from 2-ethoxy-ethanol.

EXAMPLE 3

Utilizing the procedure described in Example 2 above with the variations indicated below, the following compounds are obtained from the reactants identified below.

(a) 2 - (benzoylimino) - 5 - nitro-N-propionyl-4-thiazoline-3-acetamide, M.P. 245–247° C. (with decomposition), following crystallization from 2-ethoxyethanol; from 5.2 g. of 2-(benzoylimino)-5-nitro-4-thiazoline-3-acetamide, 50 ml. of propionic anhydride, and 4 drops of concentrated sulfuric acid. The reaction mixture is heated at 100° C. for 2 hours and then at 130° C. for one hour.

(b) 5 - nitro - 2 - (pivaloylimino)-N-propionyl-4-thiazoline-3-acetamide, M.P. 237–239° C. (with decomposition), following crystallization from methanol; from 8.0 g. of 5 - nitro-2-(pivaloylimino)-4-thiazoline-3-acetamide, 50 ml. of propionic anhydride, and 6 drops of concentrated sulfuric acid. The reaction mixture is heated at 100° C. for 3.25 hours, cooled, and diluted with ice water.

(c) N-butyryl-5-nitro-2-(pivaloylimino)-4-thiazoline-3-acetamide, M.P. 222–223° C. (with decomposition), following crystallization from methanol; from 10.0 g. of 5-nitro-2-(pivaloylimino)-4-thiazoline-3-acetamide, 50 ml. of butyric anhydride, and 6 drops of concentrated sulfuric acid. The reaction mixture is heated at 100° C. for 2.75 hours, cooled, and diluted with ice water.

(d) 2-[5-nitro - 2 - (thenoylimino)-4-thiazolin-3-yl]-diacetamide, M.P. 263–265° C., following crystallization from acetic acid; from 10.0 g. of 5-nitro-2-(2-thenoylimino)-4-thiazoline-3-acetamide, 100 ml. of acetic anhydride, and 6 drops of concentrated sulfuric acid. The reaction mixture is heated under reflux for one hour, cooled, and diluted with ice water.

(e) 5-nitro-N-propionyl - 2 - (2-thenoylimino)-4-thiazoline-3-acetamide, M.P. 255–256° C. (with decomposition), following crystallization from acetic acid; from 10.0 g. of 5-nitro-2-(2-thenoylimino)-4-thiazoline-3-acetamide, 100 ml. of propionic anhydride, and 6 drops of concentrated sulfuric acid. The reaction mixture is heated at 140° C. for 4 hours, cooled, and diluted with ice water.

(f) 5-nitro-N-propionyl - 2 - (propionylimino)-4-thiazoline-3-acetamide, M.P. 220–222° C. (with decomposition), following crystallization from ethanol; from 5.2 g. of 5-nitro-2-(propionylimino)-4-thiazoline-3-acetmide, 25 ml. of propionic anhydride, and 4 drops of concentrated sulfuric acid. The reaction mixture is heated at 100° C. for 2.5 hours, cooled, and diluted with ice water.

(g) 5-nitro-N-pivaloyl - 2 - (pivaloylimino)-4-thiazoline-3-acetamide, M.P. 197–200° C., following crystallization from methanol; from 5.0 g. of 5-nitro-2-(pivaloylimino)-4-thiazoline-3-acetamide, 50 ml. of pivaloyl chloride, and 10 drops of concentrated sulfuric acid. The reaction mixture is heated under reflux for 10 hours.

(h) 2-[2-(acetylimino) - 5 - nitro-4-thiazolin-3-yl]-diacetmide, M.P. 205° C. (with decomposition), following successive crystallizations from ethanol and ethyl acetate; from 7.5 g. of 2-(acetylimino)-5-nitro-4-thiazoline-3-acetamide, 50 ml. of acetic anhydride, and 15 drops of concentrated sulfuric acid. The reaction mixture is heated under reflux for 1.5 hours, cooled, and poured onto crushed ice.

(i) 5-nitro - 3 - [(propionylcarbamoyl)methyl]-4-thiazoline-$\Delta^{2,N}$-carbamic acid, ethyl ester, M.P. 240–242° C. (with decomposition), following crystallization from ethanol; from 3.0 g. of 3-(carbamoylmethyl)-5-nitro-4-thiazoline-$\Delta^{2,N}$-carbamic acid, ethyl ester, 15 ml. of propionic anhydride, and 3 drops of concentrated sulfuric acid. The reaction mixture is heated under reflux for one hour, cooled, and diluted with ice.

(j) 3 - [(acetylcarbamoyl)methyl]-5-nitro-4-thiazoline-$\Delta^{2,N}$-carbamic acid, ethyl ester, M.P. 218–220° C. (with decomposition), following crystallization from ethanol; from 3.0 g. of 3-(carbamoylmethyl)-5-nitro-4-thiazoline-$\Delta^{2,N}$-carbamic acid, ethyl ester, 15 ml. of acetyl chloride, and 3 drops of concentrated sulfuric acid. The reaction mixture is heated under reflux for one-half hour, cooled, and diluted with ice.

(k) N-(cyclopropylcarbonyl) - 5 - nitro-2-(pivaloylimino)-4-thiazoline-3-acetamide, M.P. 227–229° C., following successive crystallizations from ethyl acetate and methanol; from 5.0 g. of 5-nitro-2-(pivaloylimino)-4-thiazoline-3-acetamide, 25 ml. of cyclopropanecarbonyl chloride, and 4 drops of concentrated sulfuric acid. The reaction mixture is heated at 100° C. for 2 hours, kept at room temperature for 48 hours, diluted with ether, filtered, and the filtrate is evaporated to dryness.

(l) 2-[(cyclopropylcarbonyl)imino] - 5 - nitro-N-propionyl-4-thiazoline-3-acetamide, M.P. 236–238° C.; from 8.0 g. of 2-[(cyclopropylcarbonyl)imino]-5-nitro-4-thiazoline-3-acetamide, 40 ml. of propionic anhydride, and 6 drops of concentrated sulfuric acid. The reaction mixture is heated at 100° C. for 3 hours, and the purified solid is obtained after washing the initial solid product with ether and with methanol, crystallizing from acetic acid, and finally washing with warm water.

The various 2-imino-5-nitro-4-thiazoline-3-acetamides used as starting materials for the preparation of the compounds of this example are obtained as follows.

(1) 5-nitro - 2 - (pivaloylimino)-4-thiazoline-3-acetamide. To a stirred solution of 11.45 g. of 2,2-dimethyl-N-(5-nitro-2-thiazolyl)propionamide in 60 ml. of N,N-dimethylformamide is first added in portions 1.83 g. of a 66% sodium hydride in mineral oil dispersion and then 7.6 g. of 2-bromoacetamide. The resulting mixture is stirred and heated at 70–75° C. for 4 hours, cooled, and diluted with water. The solid precipitate of 5-nitro-2-(pivaloylimino)-4-thiazoline-3-acetamide that is obtained is isolated, washed with water, and dried; M.P. 199–200° C., following crystallization from ethanol.

(2) 5 - nitro - 2 - (2 - thenoylimino) - 4-thiazoline-3-acetamide. To a stirred solution of 25.5 g. of N-(5-nitro-2-thiazolyl)-2-thiophenecarboxamide in 250 ml. of N,N-dimethylformamide is added in portions 3.81 g. of a 63% sodium hydride in mineral oil dispersion. 2-bromoacetamide (14.5 g.) is added next, and the resulting mixture is stirred at room temperature for one hour and diluted with an equal volume of water. The solid 5-nitro-2-(2-thenoylimino)-4-thiazoline-3-acetamide that precipitates is isolated, washed with water, and dried; M.P. 270–271° C., following crystallization from methanol.

(3) 5 - nitro- 2 - (propionylimino) - 4 - thiazoline - 3-acetamide, suitable for use without further purification; obtained by the procedure described in (2) above from 20.1 g. of N-(5-nitro-2-thiazolyl)propionamide, 3.66 g. of a 66% sodium hydride in mineral oil dispersion, and 15.2 g. of 2-bromo-acetamide in 100 ml. of N,N-dimethylformamide.

(4) 2 - [(cyclopropylcarbonyl)imino] - 5 - nitro - 4-thiazoline-3-acetamide, suitable for use without further purification; obtained by the procedure described in (2) above from 13.8 g. of N-(5-nitro-2-thiazolyl)cyclopropanecarboxamide, 3.2 g. of a 50% sodium hydride in mineral oil dispersion, and 9.2 g. of 2-bromoacetamide in 140 ml. of N,N-dimethylformamide.

What is claimed is:
1. Thiazoline compounds having the formula

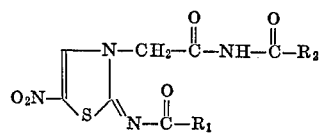

where $R_1$ is a member of the class consisting of lower alkyl, lower alkoxy, cyclopropyl, phenyl, and 2-thienyl, and $R_2$ is a member of the class consisting of lower alkyl and cyclopropyl.

2. A compound according to claim 1 which is 2-[5-nitro-2-(pivaloylimino)-4-thiazolin-3-yl]diacetamide.

3. A compound according to claim 1 which is 2-[2-(benzoylimino)-5-nitro-4-thiazolin-3-yl]diacetamide.

4. A compound according to claim 1 which is 5-nitro-N-propionyl-2-(2-thenoylimino)-4-thiazoline-3-acetamide.

5. A compound according to claim 1 which is 5-nitro-3-[(propionylcarbamoyl)methyl] - 4 - thiazoline - $\Delta^{2,N}$-carbamic acid, ethyl ester.

6. A compound according to claim 1 which is 2-[(cyclopropylcarbonyl)imino] - 5 - nitro - N - propionyl - 4-thiazoline-3-acetamide.

References Cited
UNITED STATES PATENTS
3,499,907    3/1970    Islip _____ 260—306.7

ALEX MAZEL, Primary Examiner

R. J. GALLAGHER, Assistant Examiner

U.S. Cl. X.R.

260—306.8 R, 557 R, 561 HL; 424—270